United States Patent [19]
Webb

[11] Patent Number: 5,655,036
[45] Date of Patent: Aug. 5, 1997

[54] BRANCHING UNIT FOR TELECOMMUNICATIONS OPTICAL CABLE SYSTEMS

[75] Inventor: Stephen Michael Webb, Lee, United Kingdom

[73] Assignee: Northern Telecom Limited, Montreal, Canada

[21] Appl. No.: 252,258

[22] Filed: Jun. 1, 1994

[30] Foreign Application Priority Data

Jul. 22, 1993 [GB] United Kingdom ............... 9315217

[51] Int. Cl.[6] .......................... G02B 6/26; G02B 6/42
[52] U.S. Cl. .................................. 385/15; 385/16
[58] Field of Search .......................... 385/15, 16, 24

[56] References Cited

U.S. PATENT DOCUMENTS 5,005,937  4/1991  Aida et al. ............................ 385/24
5,280,549  1/1994  Barnard et al. ....................... 385/24

Primary Examiner—Rodney B. Bovernick
Assistant Examiner—Robert E. Wise
Attorney, Agent, or Firm—Lee, Mann, Smith, McWilliams, Sweeney & Ohlson

[57] ABSTRACT

An active branching unit for interconnecting three cables (two trunk cables and one spur cable) each including optical fibres. In a first interconnection configuration fibres of the trunk cables are connected together via the spur cable. Optical switch means, comprised for example by an erbium doped fibre amplifier (EDFA) (20) and an optical attenuator (21) in series, are disposed between optical fibres of the two trunk cables and are such as to pass telecommunications traffic between the trunk cables when, for example, there is fault in the spur cable and an alternative configuration is required. In this case a pump signal is applied to the EDFA (20) and the loss of the attenuator (21) overcome so that traffic can pass directly between the trunk cables and thus be diverted from the spur cable. This path switching can be achieved automatically.

5 Claims, 3 Drawing Sheets

Fig. 1.
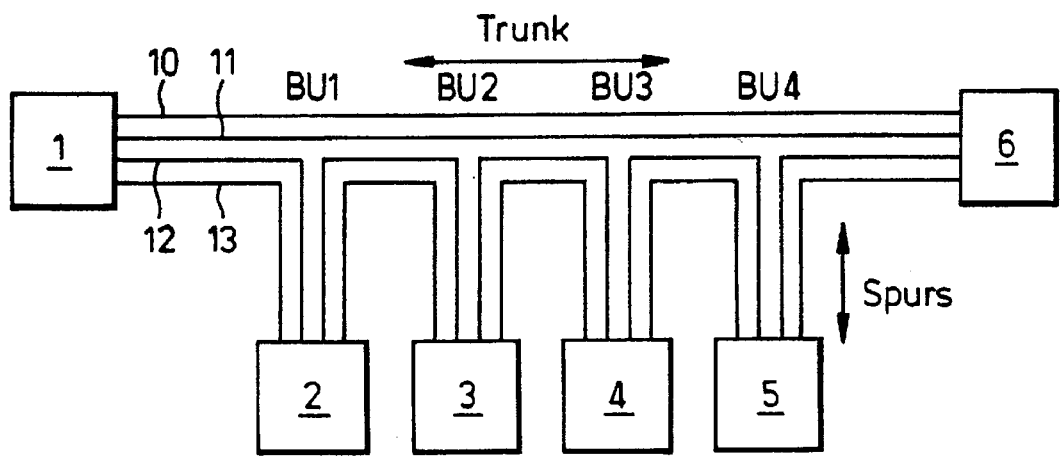
Fig. 2.
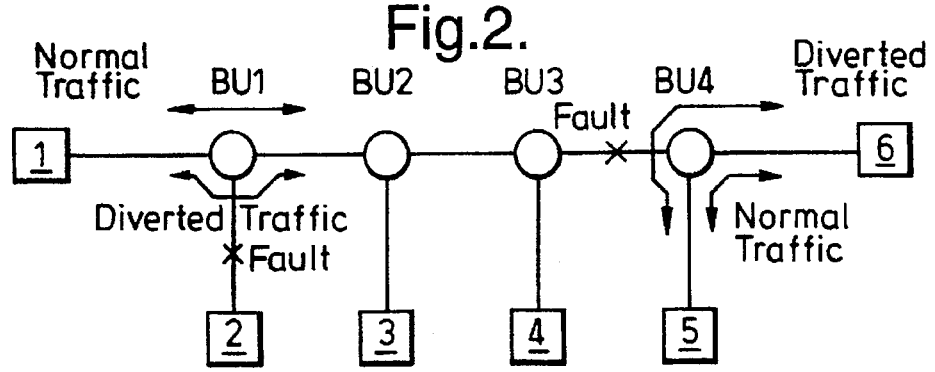
Fig. 3.
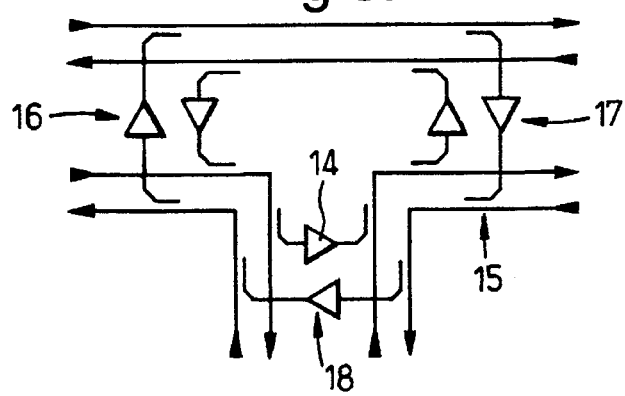
Fig. 4a.      Fig. 4b.      Fig. 4c.      Fig. 4d
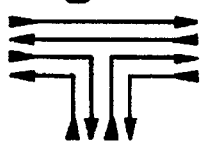 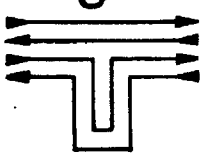 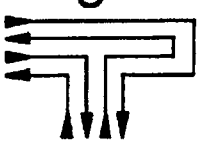 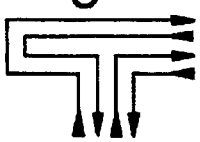

BRANCHING UNIT FOR TELECOMMUNICATIONS OPTICAL CABLE SYSTEMS

This invention relates to branching units for telecommunications optical cable systems, e.g. optical fibre submarine cable systems, and specifically to a branching unit with optical traffic switching capabilities.

Long haul, e.g. submarine cable systems originally were such as to connect two land terminals which were, for example, on opposite sides of the Atlantic ocean. A later development involved having two land terminals on one side and a third on the other side, there being a main cable extending between the third land terminal and a branching unit (y interconnect) and spur cables extending from the branching unit to the two other terminals. Repeaters may be disposed in the main cable and the spur cables and power feed provision must thus be made. The repeaters can be powered by supplying current between a land terminal (terminal station) at one end of a branch (main or spur) cable and a distant earth (single end feeding) or between any two terminal stations (double end feeding). With a known type of branching unit power feed of repeaters in the main cable and one spur cable is by double end feeding, whereas that of repeaters in the other spur cable is by single end feeding, the earth being provided by a sea earth cable integral with the branching unit. The branching unit may include relays by means of which the power feeding can be changed (switched) in the event of fault conditions in one of the branches, in order to isolate that branch whilst continuing to power the other branches.

Optical fibre submarine cable systems for long haul applications are now being designed with many landing points, and thus many branching units, and complicated traffic routing requirements. A basic branching unit suitable for multiple branching unit systems is disclosed in our GB Specification No 2252686A. This basic unit is however a passive unit, i.e. it does not involve repeaters/regenerators for the optical signals, which is designed to terminate three line cables and also to provide a sea earth for power feeding. A subsequent design included optical repeaters (regenerators) which required power feeding, as disclosed in GB Application No 9304328.9 (USA application No. 206002) in which there is a facility to power auxiliary circuitry, such as repeaters, in view of a Zener diode chain and a full wave rectifier bridge.

According to the present invention there is provided a branching unit for use in a telecommunications optical cable system for interconnecting three line cables, each including optical fibres, the branching unit including means whereby the optical fibres of the cables are initially interconnected in a first configuration and optical switch means whereby the optical fibres of the cables can be interconnected in at least one alternative configuration, wherein the optical switch means is actuable automatically in response to the occurrence of faults in the cables, and wherein the optical switches are actuable by a supervisory system for selection of any required configuration for the first configuration and/or for selection of an alternative configuration upon a cable fault occurrence.

Embodiments of the invention will now be described with reference to the accompanying drawings, in which:

FIG. 1 illustrates fibre routing in a typical submarine system;

FIG. 2 illustrates traffic switching applied to system faults;

FIG. 3 illustrates a branching unit with full optical switching;

FIGS. 4a–d illustrate the four possible configurations of the branching unit of FIG. 3

Figure 5:
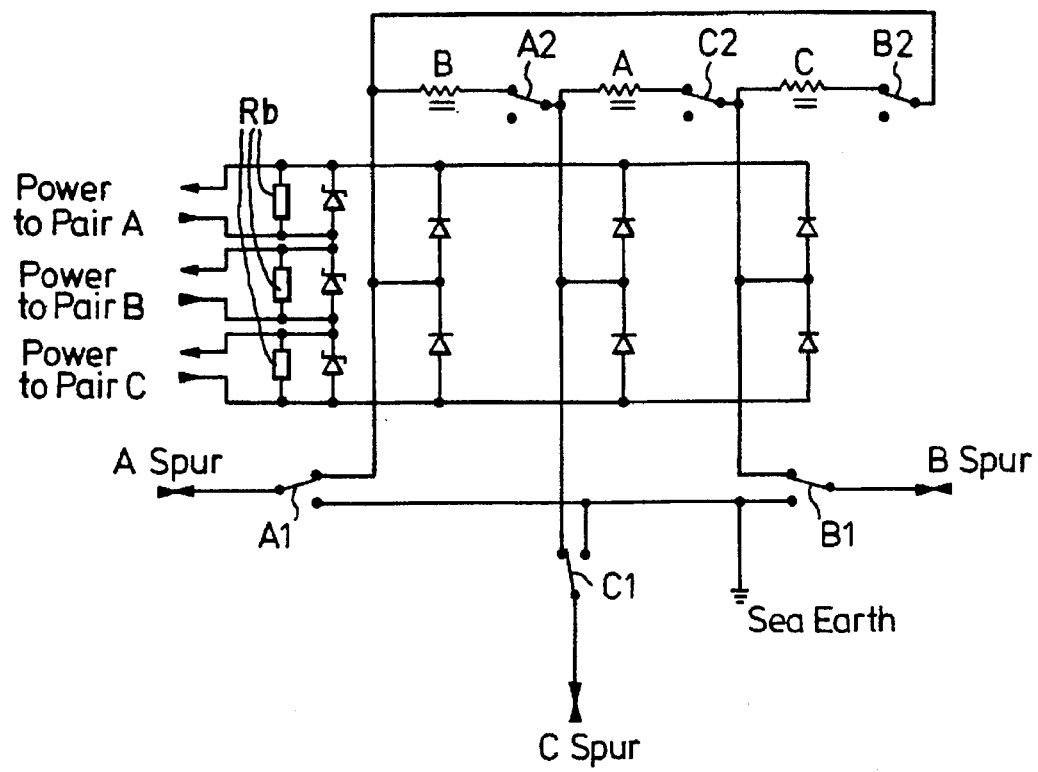
Figure 6:
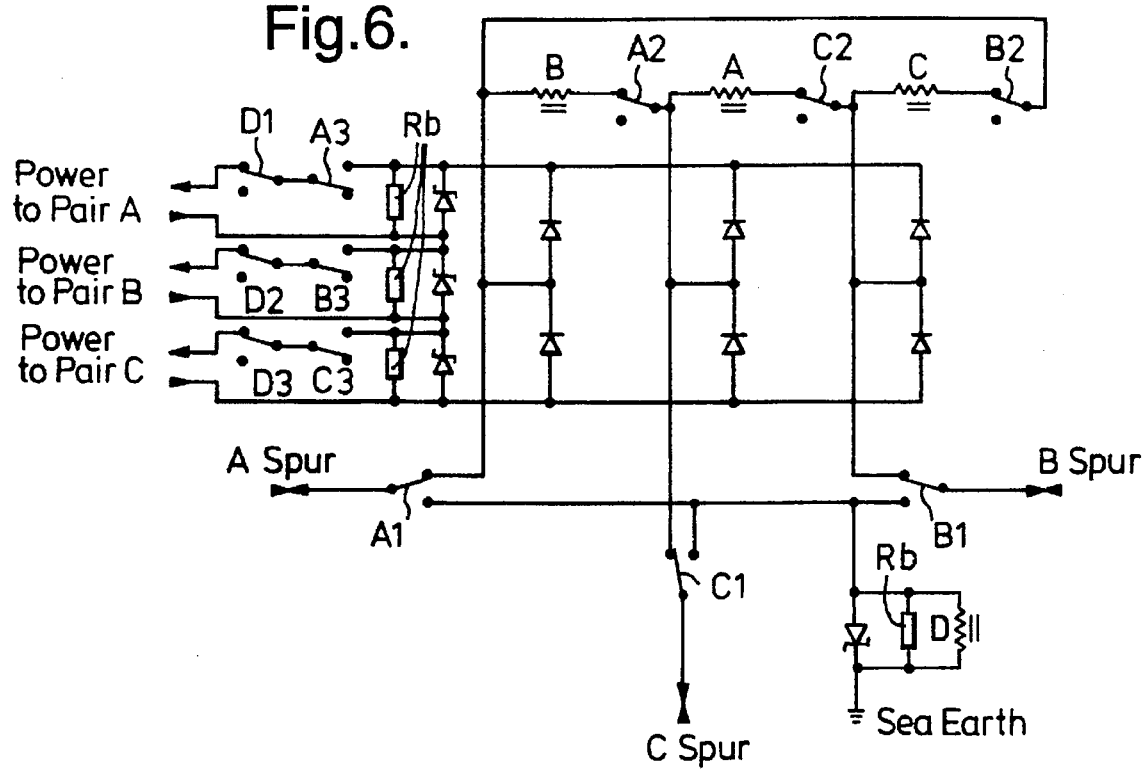
Figure 7:
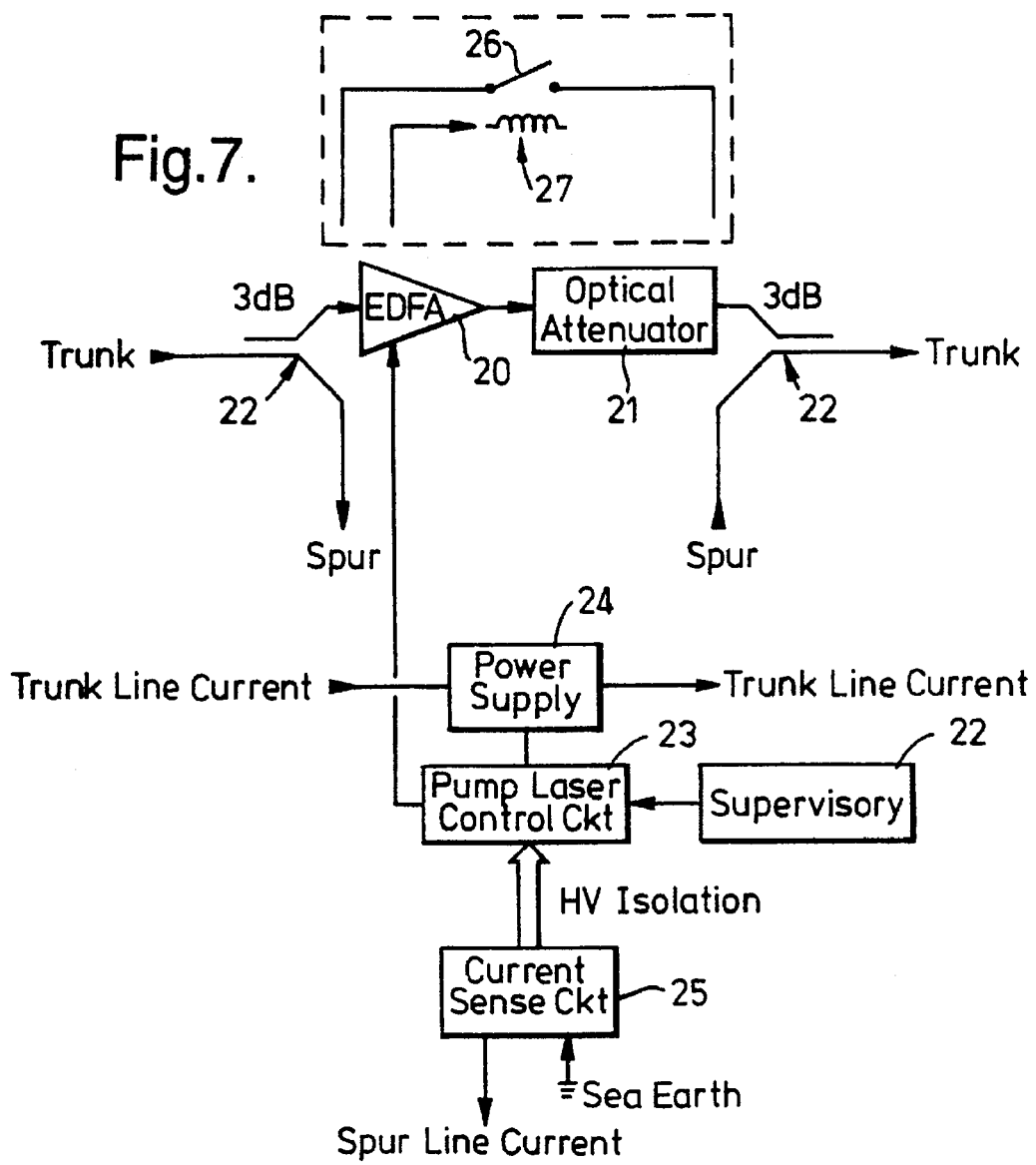
Figure 8A:
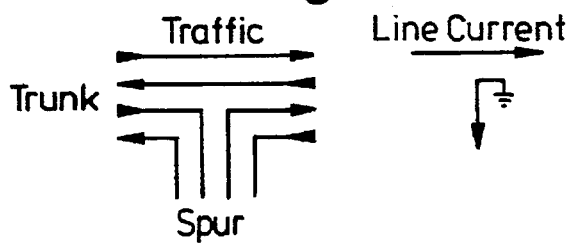
Figure 8C:
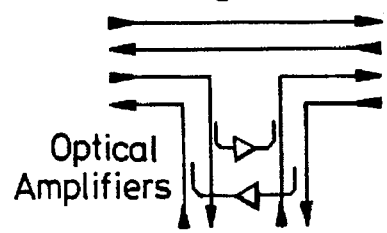
Figure 8B:
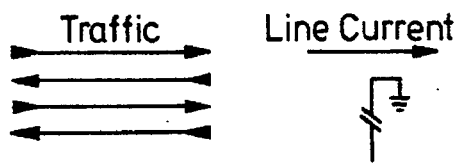

FIG. 5 illustrates in a simplified manner a branching unit with optical amplifier powering and supervisory controlled path switching;

FIG. 6 illustrates in a simplified manner a branching unit with optical amplifier powering and automatic optical path switching;

FIG. 7 illustrates in a schematic manner, and showing only one optical path for simplicity, a "self-healing" branching unit, and FIGS. 8a and 8b, respectively illustrate the normal configuration and the fault configuration; and FIG. 8c illustrates the corresponding physical arrangement.

Referring firstly to FIG. 1, there is illustrated schematically therein fibre routing in a typical system. There is a main (trunk) path consisting of a pair of optical fibres 10, 11 extending between two stations 1 and 6. There are four branching units, BU1, BU2, BU3 and BU4 at the positions indicated, and spur stations 2, 3, 4 5. Spur traffic is via a single pair of fibres 12, 13 running in and out of the spur stations 2–5 as illustrated. The trunk may have an additional alternative fibre pair (not shown). The traffic flow is considered much greater from station 1 to station 6 compared to spur stations 2 to 5. The traffic flow for the spurs may involve use of SDH (Synchronous Digital Hierarchy) technology with each spur station 2–5 extracting the respective tributaries from an SDH channel.

The trunk of a system in deep water is believed to be inherently fairly reliable i.e. unlikely to suffer cable damage, but the spurs which will be in shallower water are much more likely to suffer cable damage. With a conventional passive branching unit, i.e. one with no optical path switching, loss of a spur cable would preclude the use of one fibre pair from one side of the fault to the other. For example, if there is a fault in the spur to station 2, no traffic can flow from station 3 to station 1, from station 4 to station 1 etc. However if the branching unit BU1 is an active one which can switch its fibre routing as required, for a fault in the spur to station 2, the branching unit BU1 can restore the majority of the trunk traffic between the spurs by diverting around the fault as indicated in FIG. 2. An alternative fault between branching units BU3 and BU4 could also involve diverted traffic as illustrated, given appropriate optical switching.

This traffic diversion can be achieved with optical switches. A particular form of optical switch which can be used involves an optical amplifier, in particular an erbium doped fibre amplifier (EDFA), and an optical attenuator in series with it, this is described in greater detail hereinafter. Alternatively an electro-mechanical optical switch could possibly be used, although it may not be acceptable for reliability reasons in submarine systems. The fibre amplifier may be doped with a rare earth other than erbium FIG. 3 illustrates the full extent of switching required in a 2 fibre pair symmetrical branching unit. The optical switches 14 are coupled to the respective fibres by 3 dB optical couplers 15. Three optical amplifier switch pairs 16, 17, 18 are arranged to link the fibres via the 3 dB optical couplers. Switching the appropriate switches on and off gives four possible traffic configurations as illustrated in FIG. 4. In FIG. 4a all switches are off and the traffic on the trunk and spur paths is normal. In FIG. 4b switch pair 18 is on so that traffic is diverted from the spur. In FIG. 4c switch pair 17 is on so that trunk traffic is diverted via the spur in view of a fault to the "right" of the branching unit of FIG. 3, whereas in FIG. 4d switch pair 16 is on so that trunk traffic is diverted via the spur in view of a fault to the "left" of the branching unit. As will be appreciated the branching unit of FIG. 3 has fully symmetrical optical switching. In practice, since diverted trunk traffic would be of little use to a spur station, a system which only involves switching around spur failures is more likely to be required than one with full switching.

The optical switch pairs need to be activated under fault conditions and one way to achieve this is by use of a conventional supervisory control method. FIG. 5 illustrates how the optical amplifiers may be powered and is similar to FIG. 4 of Application No 9304328.9 referred to above. FIG. 5, which shows three switch pairs, illustrates how they may be powered off the zener chain but omits the HV surge protection, for example. Conventionally an amplifier will have a supervisory system built into it and so it may be commanded to switch itself off i.e. switch traffic. Remote supervisory is via the optical fibres.

Using such a conventional supervisory control method has the disadvantage that outside intervention is required to restore spur traffic, making it cumbersome to use on a system. FIG. 6 illustrates the branching unit modified to have the same functionality of FIG. 5 but with a form of automatic optical switching.

The switch pairs are powered off the zener chain as before but only the appropriate switch pair is allowed to switch on via contacts A3, B3, C3. Furthermore an inhibit relay D is provided to sense earth current. For example powering the main trunk from spur A to spur B will allow optical switch pair C to activate via contacts C3 with all spur C traffic being diverted along the trunk. Upon powering spur C, relay D in the sea earth will inhibit the operation of switch pair C via D3. If for any reason spur earth current stops flowing, then the D relay will drop out and re-enable optical switch pair C, diverting traffic around the spur. Thus there is provided a method of self-healing faults, which is applicable to all three powering configurations. As will be appreciated, FIG. 6 shows again a greatly simplified design with all surge protection circuitry omitted. Three-pole relays are required for this specific design, which merely illustrates the self-healing scheme. Current submarine systems are presently limited to use of two-pole vacuum relays and three-pole relays may not be usable in practice. An electro-mechanical optical switch could simply be wired in parallel with an existing HV relay to overcome this problem but the above referred to reliability issues are then raised.

A basic self-healing branching unit for an EDFA based optical switch, and which has only one optical fibre path for reasons of simplifying the drawing, will now be described with reference to FIG. 7. In practice there are fibre pairs and pairs of optical switches are required. The optical switch is formed from an EDFA 20 and an optical attenuator 21. When the EDFA 20 is powered, i.e. an optical pump laser is activated, it gives gain to compensate for the loss of the attenuator and hence an optical signal can pass between the 3 dB couplers 22 via the EDFA 20 and attenuator 21. When the EDFA 20 is unpowered, it also has a loss which coupled to that of the attenuator means a minimal signal is transmitted via EDFA 20 and attenuator 21. Thus in this arrangement the optical switch comprised by elements 20 and 21 is operated by switching the pump laser on and off. An alternative switch can be formed, as illustrated within the dashed box, by an electro-mechanical optical switch, in which case a normally open optical path 26 is closable by application of a suitable drive current to a coil 27.

Trunk line current is used to power the supervisory circuitry 22, control circuit 23 and a pump laser (not shown), via a power supply means 24. Current passing through a current sensing circuit 25 in the sea earth is arranged to inhibit the pump laser whilst the spur is powered. Should there be a spur cable cut, then the control circuit 23 will activate the optical switch (20, 21) and allow traffic to be diverted.

The current sense circuit 25 signals to the control circuit 22 via an HV isolation path. The automatic isolation may be provided by a simple vacuum relay as already used in branching units. Alternatively the switching action may be initiated by the supervisory circuitry 22 for a manual override selection of either switching state.

FIG. 8a illustrates the normal configuration for traffic and line current at a branching unit with a pair of optical switches for diverting the traffic from a spur, FIG. 8b illustrates the corresponding fault configurations, and FIG. 8c illustrates the corresponding physical configuration with pairs of fibres and pairs of optical switches, each represented simply by an optical amplifier.

The use of an active branching unit, as described for example with reference to FIG. 7, means that traffic availability matches that of UBM (Underwater Branching Multiplexer) systems because of the self-healing attributes. In the event of a powering fault the optical switches are automatically switched. The overall system reliability is improved since all drop facilities (extraction of tributaries from an SDH channel) are implemented in the terminal and since in the active branching unit standard line optical amplifiers (EDFA) are used. The use of a UBM on an optical system would not only require the development, testing and proving of an electrical add-drop facility, but also of a high speed (5 Gbit/s) optical regenerator.

The active branching unit proposed above has numerous features which set it apart from a conventional branching unit or a UBM design. In particular there is automatic "self-healing" with a very low outage time on switched fibres, with a corresponding burst of errors. In a preferred embodiment it is made of optical amplifier components and thus has the same reliability as the main path. It is a totally flexible HV switching design which enables any cable fault to be isolated. The supervisory override enables easy system configuration. Full 5 Gbit/s operation can be achieved with all off- the-shelf components, and it is a simple and robust design with minimal complexity.

Whilst the invention has been described with respect to systems including trunk fibres (10, 11, FIG. 1) it is equally applicable to systems without such trunk fibres i.e. to festoon systems. These have the same configuration as FIG. 1 but omit the trunk fibres 10, 11 and the switching serves to bypass spurs.

I claim:

1. A branching unit for use in a telecommunications optical cable system for providing selective optical and electrical interconnection between first, second cables, together comprising a main trunk cable, and a third cable comprising a branch or spur cable extending from the main trunk cable, each said cable including both optical transmission fibres for carrying communications traffic and electrical power supply conductors, each said cable being provided with respective fault detection means responsive to faults in that cable, wherein the branching unit includes optical and electrical switches actuated via the detection means whereby the optical fibres and the electrical conductors of the cables are interconnectable in a first configuration in which optical traffic is carried by all three cables and electrical connection is provided therebetween, and in at least one alternative configuration in which optical traffic is diverted away from a selected one said cable and that one said cable is electrically isolated, wherein the optical switches comprise each a respective rare earth doped optical fibre amplifier having a respective optical pump source, being in series with a respective optical attenuator and coupled between two optical fibres to be interconnected in a said alternative configuration by respective optical couplers whereby to effect said traffic diversion, and wherein the said alternative configuration is obtained when a said optical switch is activated by a respective said detection means in response to detection of a cable fault.

2. A branching unit as claimed in claim 1, wherein the unit includes respective terminations for the electrical power conductors of the first, second and third cables and an electrical power termination for an earth connection and serves to interconnect the cables and the earth for power feeding and wherein the power required for activating the optical switches is derived from current supplied via the power conductors of of said first and second cables.

3. A branching unit as claimed in claim 2, wherein the spur cable is powered via the earth, wherein the respective fault detection means comprises a current sense circuit disposed between the sea earth termination and the spur cable, and wherein when a fault in the spur cable is sensed by the current sense circuit the respective optical switch is activated.

4. A branching unit as claimed in claim 3, wherein the cables each include at least two pairs of optical fibres, wherein in the first configuration the first and second cables comprising the trunk cable have one pair of their optical fibres directly connected together and the other pair of their optical fibres connected together via the pairs of optical fibres of the spur cable, and wherein a respective optical switch for each fibre connection is disposed between the first and second cables across the fibres of the other pairs and when activated upon a spur cable fault serves to divert telecommunications traffic away from the spur cable.

5. A branching unit as claimed in claim 4, further including for the first and second cables respective optical switches between the fibres of the one and the other pairs, which switches when activated serve to direct telecommunications traffic away from a first or second cable in which a fault has occurred.

* * * * *